G. L. HUNTRESS, Jr. & C. EIBYE.
WATER LEVEL GAGE.
APPLICATION FILED SEPT. 5, 1913.
1,275,927.
Patented Aug. 13, 1918.
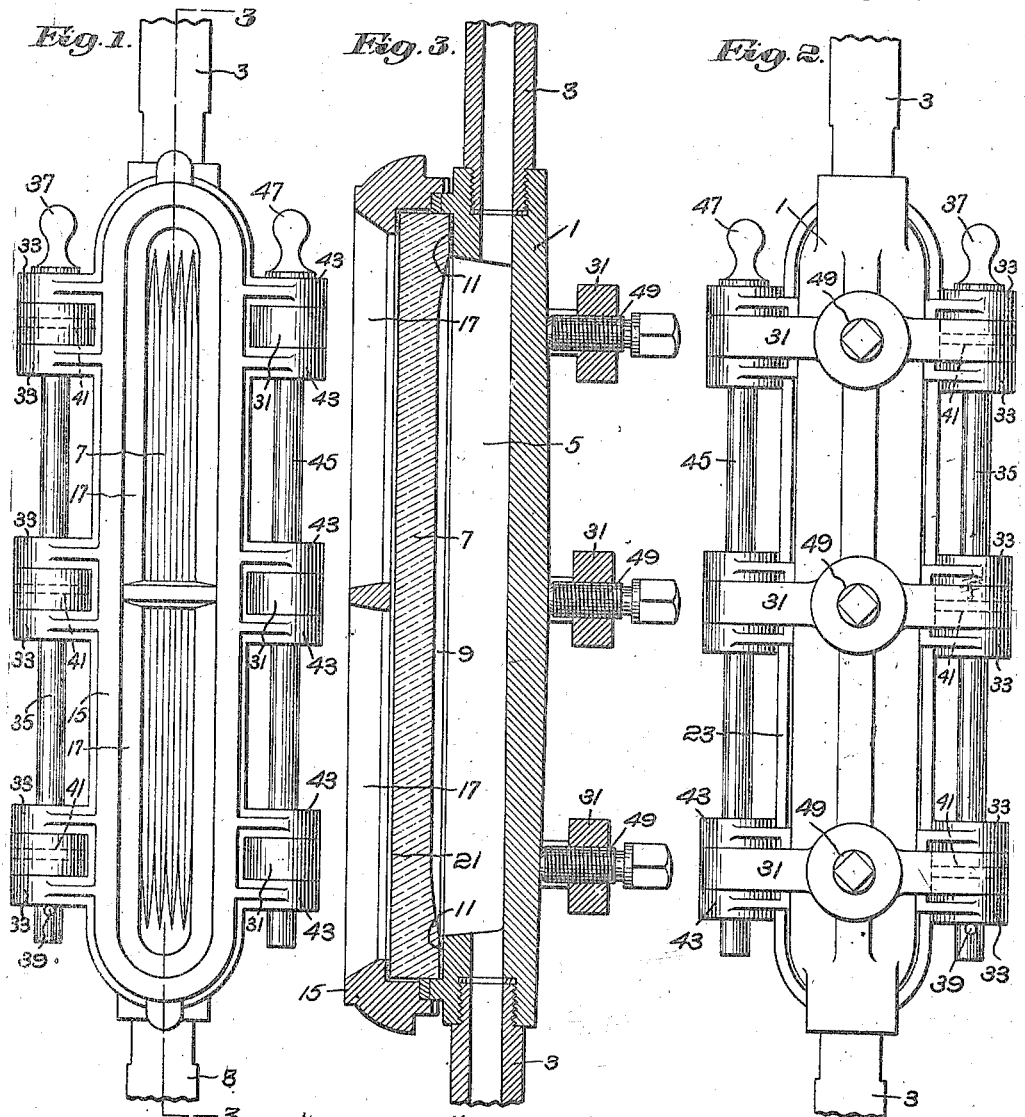
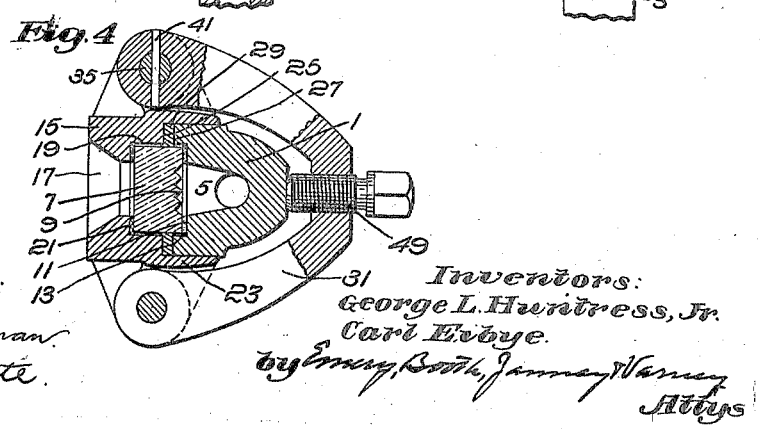
Witnesses:
Horace A. Croseman
Carl L. Choate
Inventors:
George L. Huntress, Jr.
Carl Eibye
by Emery, Booth, Janney, Varney
Attys

UNITED STATES PATENT OFFICE.

GEORGE L. HUNTRESS, JR., OF WINCHESTER, AND CARL EIBYE, OF EAST BOSTON, MASSACHUSETTS.

WATER-LEVEL GAGE.

1,275,927.

Specification of Letters Patent.

Patented Aug. 13, 1918.

Application filed September 5, 1913. Serial No. 788,348.

*To all whom it may concern:*

Be it known that we, GEORGE L. HUNTRESS, Jr., a citizen of the United States, and resident of Winchester, Massachusetts, and CARL EIBYE, a subject of the King of Denmark, and resident of East Boston, Massachusetts, have invented an Improvement in Water-Level Gages, of which the following description, in connection with the accompanying drawings, is a specification, like characters on the drawings representing like parts.

This invention relates to gages such for example as are used in disclosing the water level in locomotive, marine and other high pressure boilers.

When the gage is in use, its water containing end is subjected to a lower temperature than its steam containing end. This difference in temperature tends to expand one end of the gage more than the other. As a result, strains are set up which are liable to crack the glass employed for permitting a ready reading of the water level. One of the objects of the invention is to provide a gage construction which will permit the ready removal of a glass and the substitution of a new one therefor.

The character of the invention may be best understood by reference to the following description of an illustrative embodiment thereof shown in the accompanying drawing, wherein—

Figure 1 is a front elevation of an illustrative gage shown herein as embodying the invention;

Fig. 2 is a rear elevation of the gage shown in Fig. 1;

Fig. 3 is a vertical longitudinal section taken on line 3—3 of Fig. 1; and

Fig. 4 is a transverse section of Fig. 1 taken between the upper pairs of hinge ears.

Referring to the drawing, the illustrative gage shown therein as embodying the invention, comprises an elongated water and steam container 1, having at its ends threaded sockets for receiving pipes 3 for connection with the boiler. The front of the container is provided with an elongated aperture 5. Over this aperture there may be placed an elongated prism 7 of glass or other appropriate transparent material. To facilitate the reading of the water level in the container, the glass may have on its rear face usual facets 9 which cause the water level to appear clear cut and distinct. The glass is adapted to be seated in a recess 11 surrounding the aperture 5, an appropriate packing 13 being interposed between said glass and recess to prevent leakage between them.

To secure the glass tightly in said recess there is provided a frame 15 having elongated apertures 17 corresponding with the container aperture 5. This frame has a recess 19 receiving the glass, an appropriate packing 21 being interposed in said recess to receive and cushion the seating of the glass in said frame.

To further contribute to the preventing of leakage from the container past the glass the frame 15 is provided with a lip 23 overlapping the container 1 somewhat. Adjacent the junction of the lip 23 with the main body of the frame 15 is a ledge 25 opposed to a lip 27 on the container. Between them is interposed a packing 29 of softer material than the packing 13 between the container and glass. As a result, the packing 29 will yield sufficiently to permit the proper adjustment of the glass toward the packing 13 and container, but will prevent the escape of any fluid which might leak past the packing 13.

To secure the container glass and frame together and permit a ready assembly and separation thereof means are provided typified herein as a plurality of yokes 31 conveniently U-shaped and straddling the container 1 with ends projecting to and overlying opposite sides of the frame 15. The ends of the yokes at one side of said frame are received between pairs of ears 33 projecting from said frame and are connected thereto by a pintle 35 preferably of a length sufficient to extend through registering eyes in all of said yokes and ears. To secure said pintle against longitudinal movement it is provided at one end with a head 37 and at its opposite end with a lock pin 39. The construction just described constitutes a convenient hinge permitting the swinging adjustment of the yokes 31 as more fully hereinafter described. To cause all of the yokes to swing with the pintle as a unit, they may be fixed thereto by pins 41, or other appropriate means.

To connect or lock the opposite ends of the yokes to the frame 15 the latter is provided with pairs of ears 43 opposite and corresponding to the hinge ears 33 described. These yoke ends and ears have registering apertures adapted to receive a member shown herein in the form of a single detachable pin 45, common to all of the ears 43 and having a head 47 similar to the hinged pintle. This pin, and its ears, and the hinge pintle and its ears are similar in form and location and hence opposite sides of the gage present a symmetrical appearance.

To press the container toward the glass and frame, each yoke is provided with a tightening screw 49 threaded through the bend of the yoke and adapted to bear against the back of the container.

It will be observed that each yoke has three points of application to the gage, that is to say at its hinge, pin and tightening screw. This is a very advantageous arrangement since it permits the container readily to rock on the screw 49 as a fulcrum and seat itself evenly and naturally against the glass. As a result, when the tightening screw is set up, the container, glass and frame are pressed evenly together and thereby tend to prevent all breaking of the glass from unequal strains thereon.

When it is desired to introduce a new glass into the gage, it is merely necessary to seat the glass in the container recess, place the frame over the glass, swing the yokes 31 on their hinges, to their positions shown in Fig. 4, and drop the pin 45 through the registering apertures in the ends of the yokes and the frame ears 43. The screws 49 may then be set up to force the parts together with any pressure desired.

In removing a broken glass from the gage and substituting a new one therefor, it is not necessary to detach the container 1 or body of the gage proper from the pipes which connect it to the boiler, but it is merely necessary to adjust the swinging yokes and remove the glass frame as described.

While the gage described herein is shown as provided with three yokes for securing the container, glass and frame together, it will be understood that one or more may be used as desired. Also it is not indispensable that the plurality of yokes should be fast to their hinge pintle for simultaneous adjustment but each might be swung on its hinge independently of another, if desired.

Having described one illustrative embodiment of the invention, without limiting the same thereto, what we claim as new and desire to secure by Letters Patent is:

1. A gage comprising, in combination, a container, a frame, a glass interposed between said container and frame, and yoke means having provision permitting its swinging transversely to the length of the gage to permit the insertion of a glass in the gage.

2. A gage comprising, in combination, a container and a frame having provision for receiving a glass between them, and means for securing said parts together including yoke means straddling one of said parts and fulcrumed on the other for swinging movement transversely of the gage thereby to release the connection between the two to permit the removal of the glass or the introduction thereof to the container.

3. A gage comprising, in combination, a container and frame having provision for receiving a glass between them, and means for securing them together including yoke means hinged and fastened to one and straddling the other and screw means coöperating with said yoke means for tensioning said parts.

4. A gage comprising, in combination, a container having a lateral aperture and provision for attachment with pipe connections, a glass seated over said aperture, a frame superposed over said glass and container, and yoke means for connecting said frame with said container and having provision permitting a swinging adjustment thereof transversely to said container to uncover the same and permit insertion of a glass in the gage.

5. A gage comprising, in combination, a container having a sight aperture therein, a frame, a glass interposed between said frame and container, and means to press said parts together including a yoke having one end pivoted and its opposite end detachably connected to said frame.

6. A gage comprising, in combination, a container, a frame, a plurality of yokes hinged and secured to one and receiving the other and a glass interposed between said container and frame.

7. A gage comprising, in combination, a container, a frame, a plurality of yokes hinged and locked to one and receiving the other, and screws coöperating with said yokes for pressing the parts together and a glass interposed between said container and frame.

8. A gage comprising, in combination, a container, a frame, a plurality of yokes connected and hinged to one and receiving the other, means common to said yokes for securing the latter in closed position and a glass interposed between said container and frame.

9. A gage comprising, in combination, a container, a frame, a glass interposed between them, and means detachably connecting said frame and container including a plurality of yokes and means for effecting the sumultaneous swinging thereof in inserting and removing a glass.

10. A gage comprising, in combination, a container 1, a frame 15, a glass 7 interposed between said container and frame, and securing means therefor including a member 31 and means including a lock element 45 connecting said member with said frame for permitting the opening of said member to allow removal of the glass from or introduction thereof to the container.

11. A gage comprising, in combination, a container 1, a frame 15, a glass 7 interposed between said container and frame, and means for securing said parts together comprising yoke members 31, and means for connecting said members to said frame including elements 35 and 45.

In testimony whereof, we have signed our names to this specification, in the presence of two subscribing witnesses.

GEORGE L. HUNTRESS, Jr.
CARL EIBYE.

Witnesses:
ROBERT H. KAMMLER,
HENRY T. WILLIAMS.